United States Patent
Frampton et al.

(10) Patent No.: US 11,777,376 B2
(45) Date of Patent: Oct. 3, 2023

(54) RELUCTANCE SENSOR FOR DETECTION OF POSITION OF A ROTOR IN AN ELECTRIC MACHINE

(71) Applicant: Kohler Co., Kohler, WI (US)

(72) Inventors: Isaac S. Frampton, Strattanville, PA (US); Adam Larson, Mequon, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 17/554,478

(22) Filed: Dec. 17, 2021

(65) Prior Publication Data

US 2022/0216770 A1    Jul. 7, 2022

Related U.S. Application Data

(60) Provisional application No. 63/134,845, filed on Jan. 7, 2021.

(51) Int. Cl.
*H02K 11/22* (2016.01)
*H02K 11/225* (2016.01)
*H02K 11/33* (2016.01)
*H02K 11/30* (2016.01)

(52) U.S. Cl.
CPC ............ *H02K 11/225* (2016.01); *H02K 11/30* (2016.01); *H02K 11/33* (2016.01); *H02K 2211/03* (2013.01)

(58) Field of Classification Search
CPC ........ H02K 11/00; H02K 11/20; H02K 11/21; H02K 11/215; H02K 11/22; H02K 11/225; H02K 11/30; H02K 11/33; H02K 2211/00; H02K 2211/03

USPC .................................................. 310/68 B, 71
See application file for complete search history.

(56) References Cited

U.S. PATENT DOCUMENTS

| 4,658,162 A | 4/1987 | Koyama et al. |
|---|---|---|
| 6,104,113 A * | 8/2000 | Beifus ............... H02P 6/006 310/67 R |
| 6,608,411 B2 | 8/2003 | Horng et al. |
| 7,109,625 B1 | 9/2006 | Jore |
| 7,259,484 B2 | 8/2007 | Hosono |

(Continued)

FOREIGN PATENT DOCUMENTS

| CN | 105245079 A | 1/2016 |
|---|---|---|
| CN | 108063509 A | 5/2018 |

(Continued)

OTHER PUBLICATIONS

Takahashi et al., English Machine Translation of JP S60141156 (Year: 1985).*

(Continued)

*Primary Examiner* — Rashad H Johnson
(74) *Attorney, Agent, or Firm* — LEMPIA SUMMERFIELD KATZ LLC

(57) ABSTRACT

An electric machine includes at least a printed circuit board and a magnetically permeable element. The printed circuit board includes a reluctance coil configured to generate a voltage in presence of a magnetic flux. The magnetically permeable element has a first end positioned adjacent to a rotor of the electrical machine and a second end positioned adjacent to the coil of the printed circuit board. In some examples, rotation of the rotor causes a change in the magnetic flux through the magnetically permeable element and generation of the voltage across the reluctance coil.

18 Claims, 17 Drawing Sheets

(56) References Cited

U.S. PATENT DOCUMENTS

| | | |
|---|---|---|
| 7,282,828 B2 | 10/2007 | Takeuchi |
| 7,888,834 B2 | 2/2011 | Tsai et al. |
| 8,154,161 B2 | 4/2012 | Horng et al. |
| 8,375,561 B2 | 2/2013 | Yan et al. |
| 10,141,823 B2 | 11/2018 | Ji et al. |
| 10,680,479 B2 | 6/2020 | Schuler et al. |
| 10,748,689 B2 | 8/2020 | Kim et al. |
| 10,778,071 B2 | 9/2020 | Kim et al. |
| 2004/0007926 A1 | 1/2004 | Tsukada |
| 2009/0218973 A1* | 9/2009 | Pollock ............... H02P 25/098 318/400.32 |
| 2013/0069475 A1 | 3/2013 | Ocket et al. |
| 2014/0184030 A1* | 7/2014 | Labriola, II ......... G01D 5/2451 310/68 B |
| 2018/0131302 A1 | 5/2018 | Frampton et al. |
| 2019/0044419 A1* | 2/2019 | Matsu ................. H02K 11/225 |
| 2019/0149002 A1 | 5/2019 | Kim et al. |
| 2022/0320904 A1* | 10/2022 | Li ........................... H02J 50/10 |

FOREIGN PATENT DOCUMENTS

| | | |
|---|---|---|
| DE | 10125646 A1 | 1/2002 |
| JP | S60141156 A | 7/1985 |
| JP | H11206077 A | 7/1999 |

OTHER PUBLICATIONS

Extended European Search Report from European Patent Application No. 22150068.9, dated Jun. 7, 2022, 8 pages.

\* cited by examiner

RELUCTANCE SENSOR FOR DETECTION OF POSITION OF A ROTOR IN AN ELECTRIC MACHINE

CROSS-REFERENCE TO RELATED APPLICATIONS

This application claims priority benefit to U.S. Provisional Utility Application Ser. No. 63/134,845 filed on Jan. 7, 2021. The entire disclosure of which is hereby incorporated by reference.

TECHNICAL FIELD

This disclosure relates in general to the field of electric machines including motors and generators, and in particular, the detection of position of a rotor in an electric machine. Example electric machines include DC motors and generators, alternators and synchronous motors, and induction motors or asynchronous machines. The electric machines include a rotating part, referred to as the rotor, and a stationary part, referred to as the stator. Control of the electric machine may require, or otherwise be improved by, detection of the relative positions of the rotor and the stator.

DETAILED DESCRIPTION

An electric machine may be an electromagnetic rotating machine that includes a rotor and a stator. The rotor and stator are positioned on opposite sides of an air gap through which a magnetic field is present and magnetic flux flows between the rotor and the stator. The magnetic field may be created by permanent magnets or by current flowing in a winding. While other examples are possible, the electric machine may be a motor or a generator. The generator, which may be referred to as an engine-generator set or a genset, may include a power source (e.g., an engine) and an alternator or another device for generating electrical energy or power from mechanical energy. The motor, on the other hand, receives electrical energy and converts it to mechanical energy by outputting torque.

Controlling an electrical machine often requires feedback of absolute or relative position of the rotating element, called the rotor. This position is often measured using a position sensor. The position sensor can utilize a variety of different techniques, such as mechanical sensors, mechanical commutators, optical sensors, variable reluctance sensors, and hall effect sensors. Electrical machines are often coupled to engines. In this case, the engine is often controlled by an engine control unit (ECU). The ECU often requires engine position information for appropriate sequencing of certain engine actuators, such as fuel injectors, ignition devices, emissions control devices, protective functions, or control of the engine speed.

The following embodiments include a rotor position sensing system based on a magnetic field and/or reluctance caused by the rotation of the rotor of the electric machine. In one example, the rotor of the electric machine includes rotor teeth (extension of steel or other metal) and slots (absence of steel or other metal) between the rotor teeth. A printed circuit board (PCB) includes a sensing coil. A current or voltage generated in the sensing coil of the PCB may fluctuate according to the magnetic field or reluctance through the sensing coil. As the rotor teeth pass near the sensing coil, the magnetic field or reluctance is modified. A controller (e.g., ECU) may monitor and detect fluctuations in the generated current or voltage in order to determine how many teeth are passing the sensing coil and/or the speed at which the teeth are passing the sensing coil in order to determine the position and/or speed of the rotor. In one example, the PCB also includes the stator windings for the electrical machine. The PCB may include an outer portion (e.g., outside the magnetic portion of the rotor) including the sensing coil and an inner portion (e.g., adjacent to the magnetic portion of the rotor).

Figure 1:
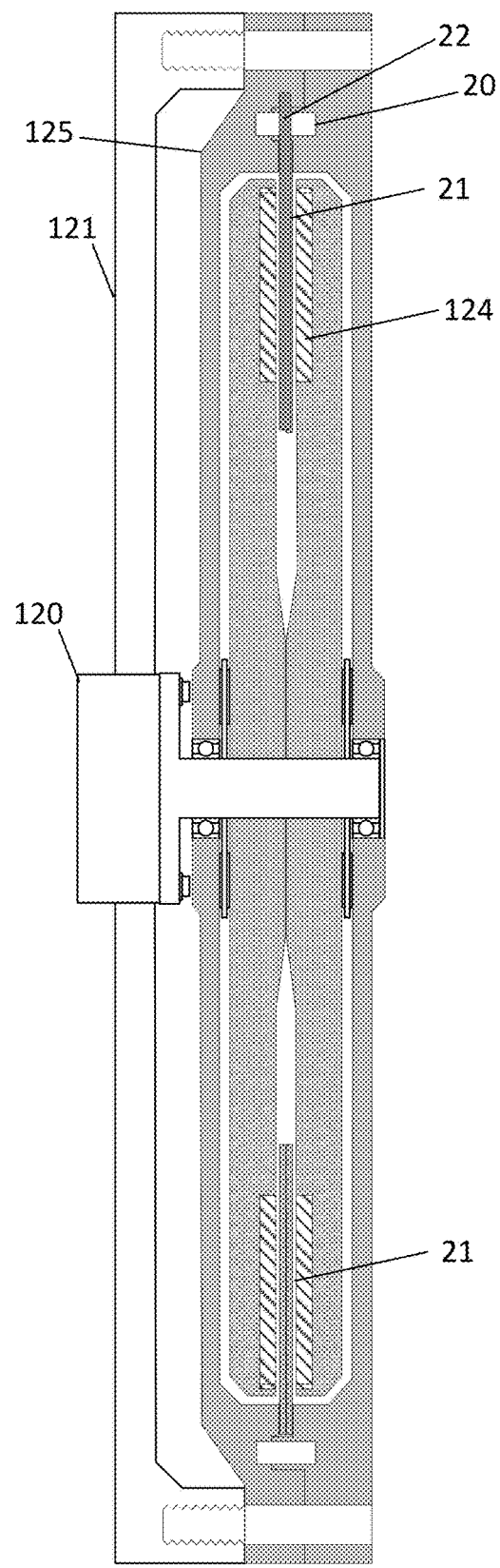
FIG. 1 illustrates an example electric machine.

FIG. 1 illustrates an example electric machine including a rotor position detection system 20 and a stator implemented by PCB 21 arranged in cooperation with a rotor 124 including permanent magnets. The permanent magnets define a magnetic region where the flux from the magnets varies significantly while the rotor is rotating. The magnetic region may reside radially between an inner diameter of the magnets and an out diameter of the magnets. The magnetic region may extend slightly outside the region defined by the inner and outer diameter of the magnets. A sensing coil 22 is located outside of the magnetic region defined by the inner and outer diameter of the magnets. The sensing coil 22 may be a predetermined distance (e.g., 1 inch, 3 centimeters, 10 centimeters, or another value) outside of the magnetic region. The predetermined distance may be selected according to one or more factors. One example factor is based on a rotating feature such as the tooth or hole. For example, the predetermined distance may be based on the size of relative permeability of the tooth or hole. Another example factor is based on a stationary feature such as the permeable element. For example, the predetermined distance may be based on the size of relative permeability of the permeable element. One example factor is the length of magnetic path when permeable feature is present. One example factor is the length of magnetic path when permeable feature is not present. One example factor may include mechanical tolerances in the machine (such as end play or manufacturing tolerance).

The area outside the region defined by the inner and outer diameter of the magnets may be referred to as the non-magnetic region, periphery, or outer sensor region.

The stator is supported in a stator clamshell 125 which is connected to an engine block 121. The rotor 124 is supported by bearings connecting it to the stator clamshell 125 and an engine crankshaft 120. The printed circuit board may include coils of wire, or traces, that are energized in response to relative movement of magnets through electromagnetic induction. The coils may be included in different layers of the printed circuit board. Because the coils reside on the printed circuit board, the armature inductance (caused by the permeability of the iron used to direct the magnetic flux through the windings) may be lower, which may decrease the voltage drop under load, improve the efficiency of the generator and decrease the commutation losses in semiconductor diodes connected to rectify the output of the machine to direct current.

The shape of the windings may include concentric circles, rectangles, trapezoids to match magnet shape, or another shape. The exciter windings may be formed from copper or another conductive material. The traces may exist on multiple layers of the PCB. The traces forming the exciter windings are configured to induce a field current in response to magnetic fields of the stator magnets.

Although embodiments illustrated herein relate to an axial air gap electrical machine, embodiments are contemplated relating to a radial air gap electric machine, an engine, a driven component, such as a drive shaft, a fan, a propeller or similar driven component. In addition, the scope of the disclosure disclosed herein is not limited to position sensing for a rotating element. One skilled in the art can apply the concepts herein to any situation where a physical quantity may be measured based on the reluctance of a magnetic path. Examples include but are not limited to, linear position measurement, pressure measurement, sound measurement, temperature measurement, magnetic saturation level, allotrope characteristics, metallurgical characteristics, force measurement, and torque measurement.

Figure 2:
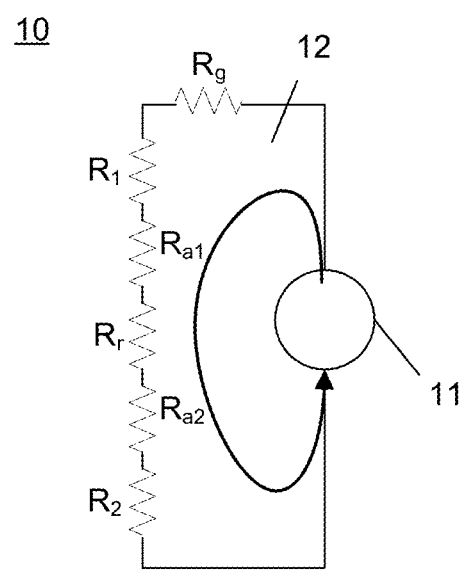
FIG. 2 illustrates an example magnetic equivalent circuit for the example rotor position sensing system.
Figure 3:
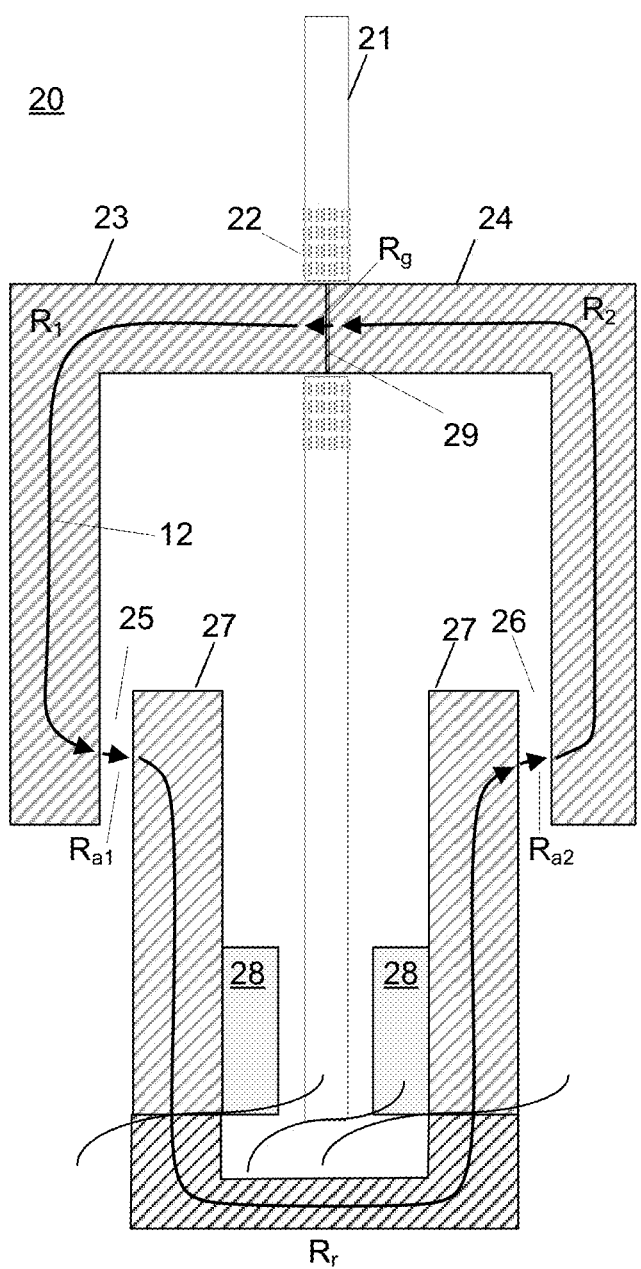
FIGS. 3 and 4 illustrate an example rotor position sensing system.
Figure 4:
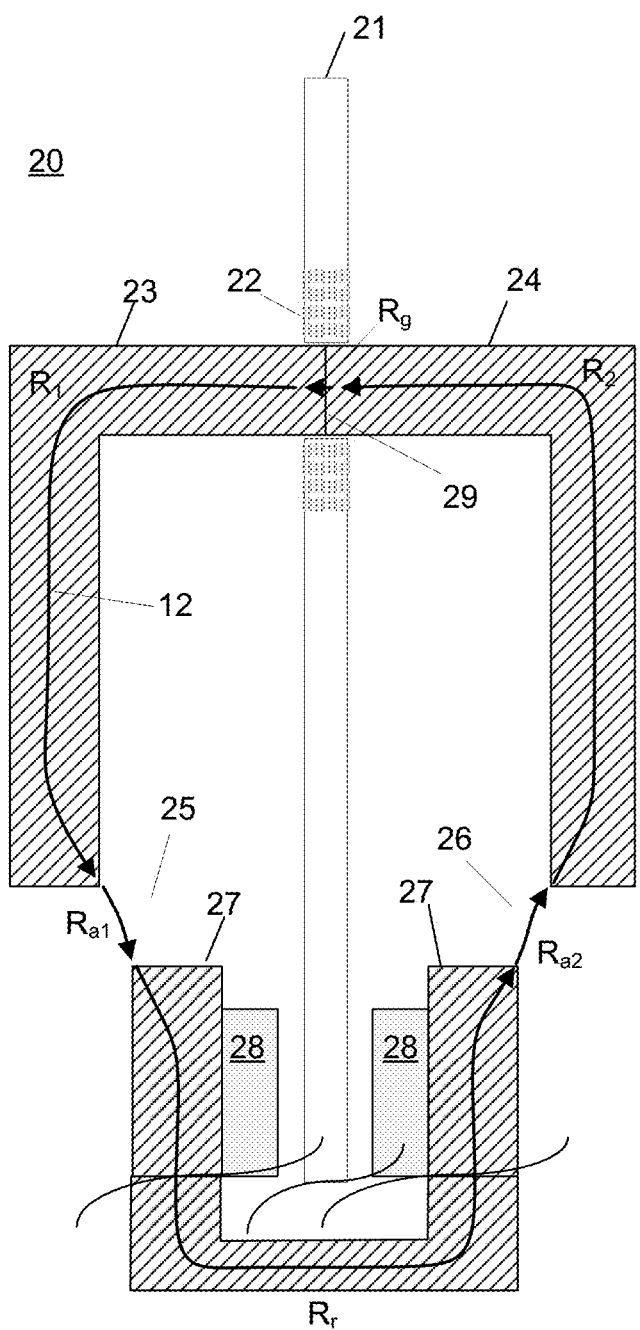

FIG. 2 illustrates an example magnetic equivalent circuit 10 for the example rotor position sensing system 20 illustrated in FIGS. 3 and 4. For the example magnetic equivalent circuit 10, the current in the equivalent circuit 10 corresponds to the magnetic flux through the magnetic path 12 illustrated in FIGS. 3 and 4. The current in the magnetic equivalent circuit 10 is related to the total magneto-motive force supplied to the circuit and the total equivalent resistance along the magnetic path, represented by the sum of $R_g$, $R_1$, $R_2$ $R_{a1}$, and $R_{a2}$.

The example magnetic equivalent circuit 10 is supplied by a magneto-motive force (MMF) generated by a magnetic field generation device 11. Typical examples of a magnetic field generating device 11 include an electrically conductive coil (e.g., one or more coil traces on a PCB), a single electrical conductor, a solenoid, a permanent magnet, and residual magnetism in a ferrous material, or others.

The resistance $R_g$ corresponds to the reluctance added to the magnetic circuit by the air gap 29 between a first permeable element 23 and a second permeable element 24. The resistance $R_1$ corresponds to the reluctance added to the magnetic circuit by the first permeable element 23. The resistance $R_2$ corresponds to the reluctance added to the magnetic circuit by the second permeable element 24. The resistance $R_{a1}$ corresponds to the reluctance added to the magnetic circuit by a first air gap 25. The resistance $R_{a2}$ corresponds to the reluctance added to the magnetic circuit by a second air gap 26. The resistance $R_r$ corresponds to the reluctance added to the magnetic circuit by a ferrous rotating element 27.

The rotating element 27 may include of multiple rotating elements connected by a magnetically permeable path, the rotating element 27 may include of a single rotating element. The rotating element 27 may have permanent magnets 28 connected to it by a securement device, such as an adhesive, a mechanical retainer, fusing of material, a weld, a press fit, a fastener, such as a screw, or another securement device. The permanent magnets 28 may be formed as a part of the rotating element. The permanent magnets 28 may be discrete pieces of permanent magnet material, such as a neodymium magnet or NdFeB, Samarium Cobalt, ferrite, ceramic, AlNiCo, or a different type of material. The permanent magnets may be locally magnetized portions of a disc composed of permanent magnet material.

The permanent magnets 28 may provide a magnetic flux that may flow through the printed circuit board 21, potentially generating a voltage in windings distributed on the printed circuit board 21. The voltage generated in windings distributed on the printed circuit board 21 may provide a substantial portion of the torque produced or consumed by an electrical machine. The rotor position detection system 20 may be used to determine a commutation time and sequence for current flowing in windings distributed on the printed circuit board 21.

For each resistive element in the example magnetic equivalent circuit 10, the reluctance is related to the length of the path and the relative permeability of the material though which the magnetic flux will pass. The relative permeability of ferrous materials may be significantly greater than the relative permeability of air, as an example, the relative permeability of silicon steel may be 5,000 or 10,000 time the permeability of air.

For the example rotor position sensing system 20, the relative permeability of the first permeable element 23, second permeable element 24 and ferrous rotating element 27 is approximately 6,000 times the permeability of air. Due to the geometry of the example rotor position sensing system 20, $R_{a1}$ and $R_{a2}$ comprise about 70% of the reluctance in the magnetic circuit in FIG. 3 and about 93% of the reluctance of the magnetic circuit in FIG. 4.

For the example rotor position sensing system 20, the magnetic field generating device 11 is the coil 22, comprised of traces on multiple layers of a printed circuit board (PCB). Due to magnetic induction, the voltage generated by the coil 22 is related to the rate of change of the magnetic flux through the coil. The magnetic flux through the coil depends on the current flowing through the coil 22 as well as the reluctance of the magnetic path 12. With a constant current, the magnetic flux, and thereby the voltage, depends on the reluctance of the magnetic path 12.

In addition, the inductance of a coil may be related to the magnetic path length for the flux flowing through the coil. The magnetic path length may be directly measured by directly measuring the inductance of the coil. The inductance of a coil may be measured by applying a voltage to the coil and monitoring the resulting behavior of the current. The voltage applied to the coil may be a time varying voltage. The resulting behavior of the current may be monitored for amplitude, rise rate, fall rate, phase shift, time constant, or other similar characteristics.

Figure 5:
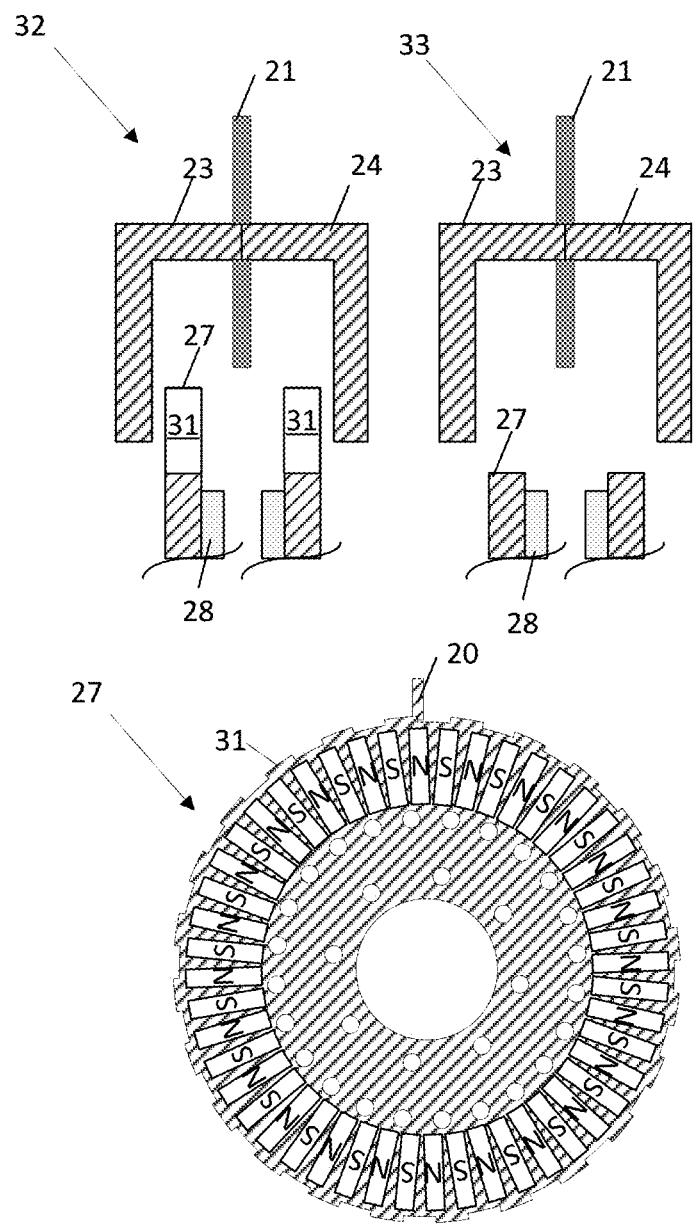
FIGS. 5, 6, and 7 illustrate additional example embodiments of rotor position sensing system.
Figure 6:
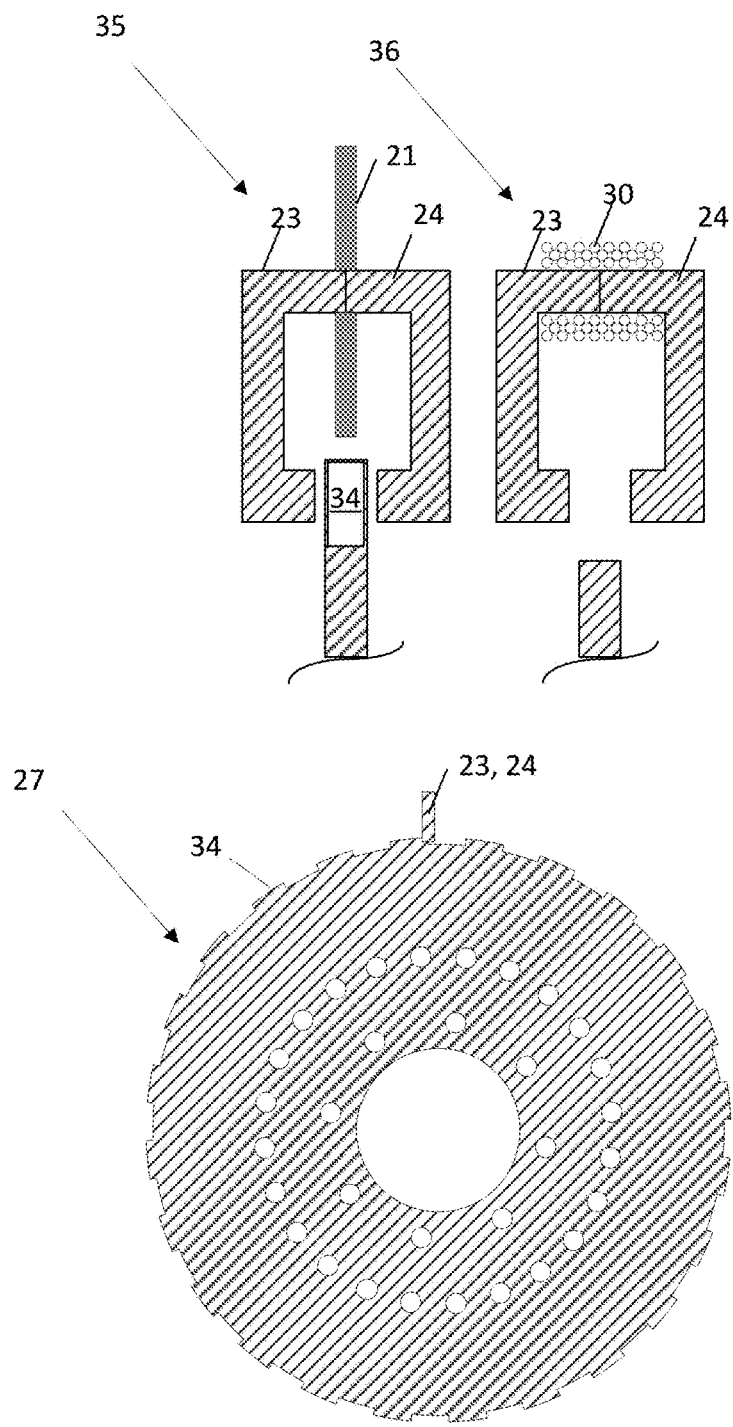
Figure 7:
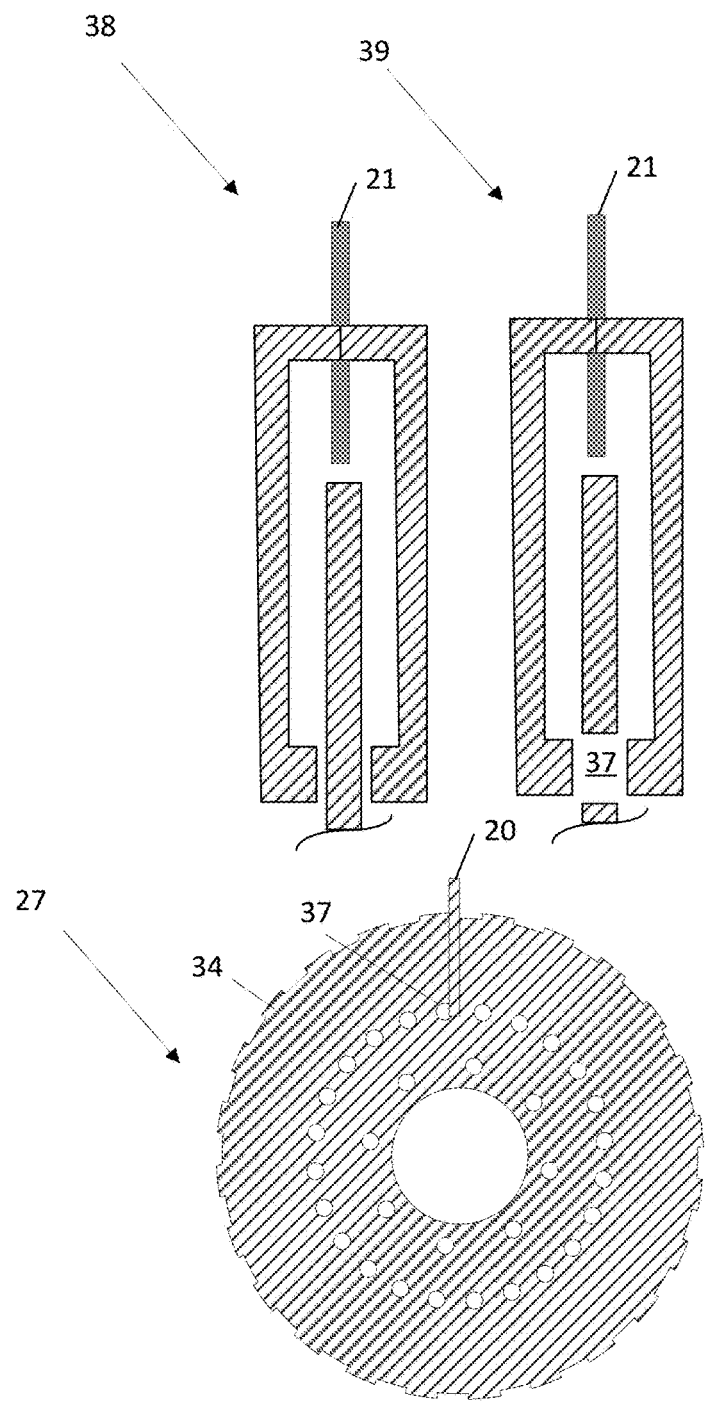

FIGS. 5, 6, and 7 illustrate additional example embodiments of rotor position sensing system 20. In the example of FIG. 5, rotor position sensing system 20 may include a multi-element rotor with external teeth 31, shown with teeth present in a first state 32 and teeth absent in a second state 33.

FIG. 6 illustrates an example in which the rotor position sensing system 20 may include a single-element rotor with external teeth 34, shown in a first state 35 with teeth present (in line with the sensor) and in a second state 36 with teeth absent (not in line with the sensor). FIG. 7 illustrates an example in which the rotor position sensing system 20 may include a multi-element rotor with position sensing holes 37, shown with a hole out of alignment with the sensor in state 38 and hole in alignment with the sensor in state 39.

Figure 8:
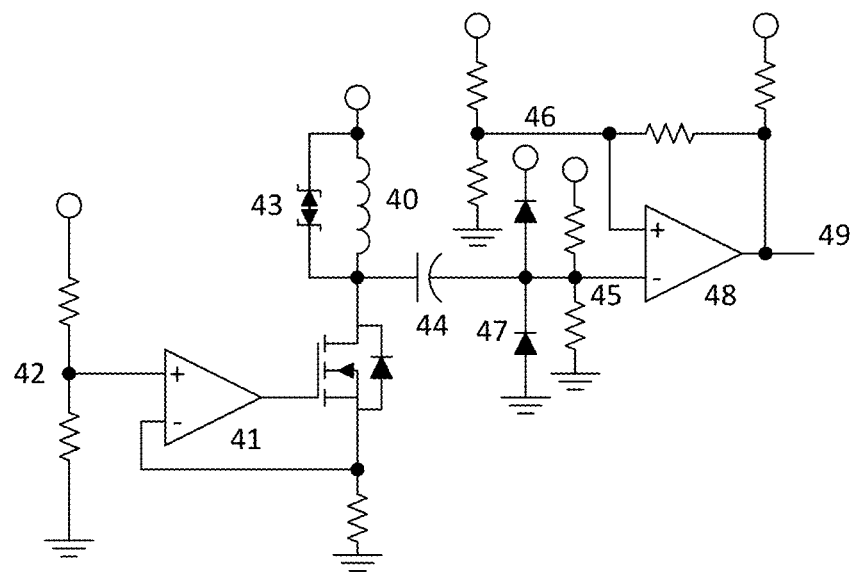
FIG. 8 illustrates an example driving and filtering circuit to apply a constant direct current and to extract a signal for magnetic flux through the reluctance sensor.

The magnetic field generation device 11 may provide a constant magneto motive force by applying a constant direct current to coil of the rotor position sensing system 20. FIG. 8 illustrates an example driving and filtering circuit to apply a constant direct current to coil of the rotor position sensing system 20 and to extract a meaningful signal indicating the rate of change in the magnetic flux through the magnetic path detected by the sensor. This signal may be further processed to provide a tooth indication signal.

In one example, the current to the coil of the rotor position sensing system 20 may be varied based on the speed of the rotating element (e.g., rotating element 27). For example, the current amplitude or an excitation frequency may be varied in the AC drive case.

The driving and filtering circuit illustrated in FIG. 8 illustrates the coil providing the magneto-motive force to the magnetic equivalent circuit, such as the coil of the rotor position sensing system 20, as inductive element 40. The current through coil (inductive element 40) is controlled by current source 41 to a constant target set by resistive divider 42. The current source 41 may be an integrated circuit, a field effect transistor (FET) controlled by an Op-Amp, a bipolar junction transistor (BJT) controlled by an Op-amp, a BJT with compensated drive current, or another type of current source.

Changes in the magnetic path length for the flux flowing through the inductive element 40 may cause a voltage to be generated across inductive element 40. This voltage may be limited by protective device 43 to prevent damage to the components of the current source 41. Protective device 43 may be a Zener diode, gas discharge tube, varistor, avalanche diode, combination of such elements or other protective device. Protective device 43 may be omitted.

The decoupling capacitor 44 removes the DC component of the voltage across the inductive element 40 from the incoming signal 45, potentially improving immunity to changes in the DC voltage across the inductive element 40, which may be a result of temperature fluctuations, manufacturing tolerance, physical positioning environmental effects, or other factors that do not relate to the magnetic path length and are not desirable to measure. Embodiments are contemplated where the decoupling capacitor 44 is not included.

The comparison voltage 46 represents a threshold indicating a typical inductive element 40 voltage when resting. The comparison voltage 46 may be provided by a resistive divider or may be derived from the incoming signal 45 through a filter.

The overvoltage protection circuit 47 may act to prevent the incoming signal 45 from exceeding the allowable input limits for the comparator 48. The protective elements in the overvoltage protection circuit 47 may be Zener diodes, rectifier diodes, Schottky diodes, varistors, gas discharger tubes, avalanche diodes, or another protective device. The overvoltage protection circuit 47 may be omitted if unnecessary under all operating conditions.

Based on the operation of the comparator 48, the output signal 49 may represent a digital signal resulting from the analog incoming signal 45 for use by digital circuitry such as a logic device, a microprocessor, a microcontroller, a complex programmable logic device (CPLD), a field programmable gate array (FPGA), or another device that solves digital logic. Embodiments are contemplated where the incoming signal 45 is fed directly into an analog circuit device or converted to a digital signal using an analog to digital converter or similar device.

Figure 9:
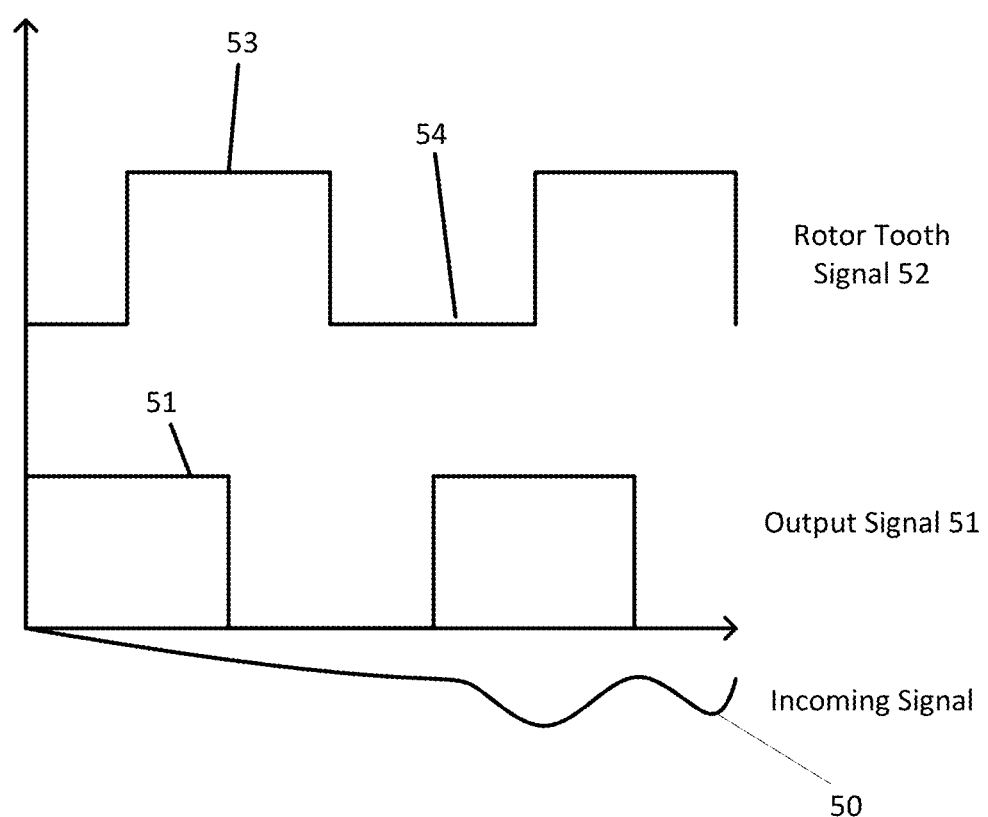
FIG. 9 illustrates example waveforms produced by the circuit illustrated in FIG. 8.

FIG. 9 illustrates example waveforms produced by the circuit illustrated in FIG. 4 when inductive element 40 represents the coil for the rotor position detection system 20 from FIGS. 3 and 4. Analog waveform 50 represents an example of incoming signal 45. Digital waveform 51 illustrates an example of output signal 49. Rotor tooth signal 52 illustrates presence of a tooth aligning with the first permeable element 23 and second permeable element 24. Maximum alignment position 53 corresponds to FIG. 3. Minimum alignment position 54 corresponds to FIG. 4.

In most cases, a rotor position detection system 20 applying a constant magneto-motive force using a permanent magnet or a constant current through an inductive element 40, such as the coil from the rotor position detection system 20, may only detect position when the ferrous rotating element 27 is moving. When the ferrous rotating element 27 is stopped, the magnetic flux through the coil may remain substantially constant, likely resulting in a very small or zero rate of change for the flux, which may generate a very small or 0 voltage across the inductive element 40.

Figure 10:
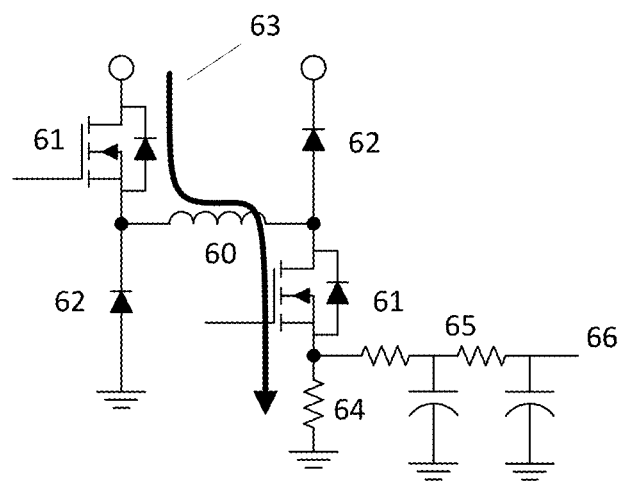
FIGS. 10 and 11 illustrate an example driving and filtering circuit to apply a time-varying voltage and extract a signal indicating the length of the magnetic path.
Figure 11:
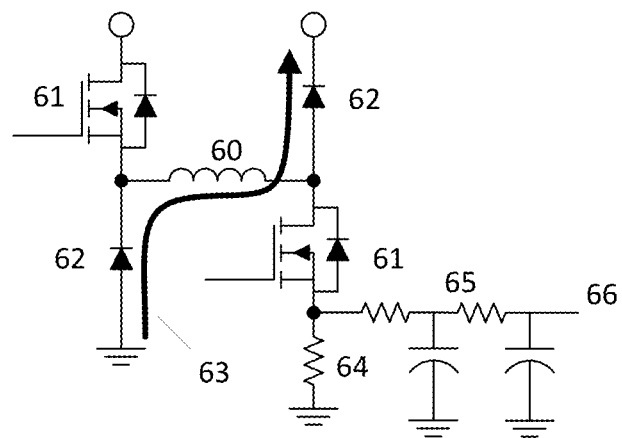

The magnetic field generation device 11 may provide a time-varying magneto motive force by applying a time-varying current or a time varying voltage to coil 22. FIGS. 10 and 11 illustrate an example driving and filtering circuit to apply a time-varying voltage to an inductive element 60 and to extract a meaningful signal indicating the length of the magnetic path for flux passing through the inductive element 60, first permeable element 23 and second permeable element 24. This signal may be further processed to provide a tooth indication signal.

The time varying drive circuit shown in FIGS. 10 and 11 contains an increasing current path (illustrated in FIGS. 19-22) and a decreasing current path (illustrated in FIGS. 23-30). The current 63 follows the increasing current path through the increasing current switches 61, the inductive element 60, and the current sensing resistor 64 when the increasing current switches 61 are active. The current 63 follows the decreasing current path through the alternate passive path components 62 and the inductive element 60 when the increasing current switches 61 are not active until the current 63 through the inductive element 60 reaches a lower threshold value, such as 0.

The increasing current switches 61 may be driven to switch at a frequency. This frequency may be a fixed frequency much greater than an intended measurement frequency, a variable frequency or another frequency. The increasing current switches may be driven at a 50% duty cycle, a duty cycle slightly less than 50% to prevent windup when a tooth is moving into alignment with the first permeable element 23 and the second permeable element 24. The increasing current switches may be driven at a varying duty cycle or another duty cycle.

The increasing current switches 61 may be semiconductor switches, such as FETs, BJTs, insulated-gate bipolar transistors (IGBTs), or another semiconductor switch. The increasing current switches 61 may be other switches, such as MEMs switch elements, relays, contacts, or any other device capable of switching electrical current. The alternate passive path components 62 may be semiconductor devices, such as rectifier diodes, Schottky diodes, Zener diodes, avalanche diodes, or another passive electric current conductive element. The alternate passive path components may be a semiconductor switch, such as a FET, BJT or IGBT, or another current switching device.

When current flows through the increasing current path, this current will flow through current sensing resistor 64. Current through current sensing resistor 64 will result in a voltage across the current sensing resistor 64, proportional to the current through the current sensing resistor 64. The voltage across current sensing resistor 64 may be filtered by a filter to provide a representative position waveform 65.

One skilled in the art may see that the current sensing resistor 64 may be applied to any portion of the increasing or decreasing current path and still provide similar behavior. In addition, embodiments are contemplated where the current through the inductive element 60 is measured by a different current measurement technique, such as a closed-loop magnetic sensor, an open-loop magnet sensor, passive current sensing across one or more increasing current switch or other means of measuring current. In some cases, current sensing resistor may be omitted.

In addition, embodiments are contemplated where voltage is applied to the inductive element 60 using various circuit topologies. The embodiments disclosed herein may be driven by a wide variety of fixed and time-varying current or voltage sources.

Figure 12:
FIGS. 12 and 13 illustrate an example waveform representing the current through the reluctance sensor.
Figure 13:
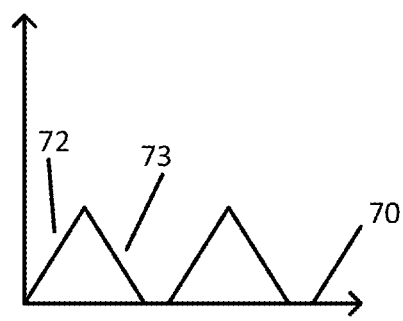

FIGS. 12 and 13 illustrate an example waveform representing the current through the inductive element 60 where the inductive element 60 represents the coil of the rotor position detection system 20 represented by traces on a printed circuit board. FIG. 12 illustrates an example waveform representing the current through the inductive element 60 when the rotor is in the position illustrated by FIG. 3. FIG. 13 illustrates an example waveform representing the current through the inductive element 60 when the rotor is in the position illustrated by FIG. 4.

It is possible to determine the absence or presence of a tooth or hole based only on characteristics of the current through the inductive element 60 as sensed by current sensing resistor 64 in example system illustrated by FIGS. 10 and 11. In this case, it may be possible to determine the position of the ferrous rotating element 27 without the need for movement of the ferrous rotating element. Such a possibility may provide enough benefit over a constant magneto-motive force rotor position sensing technique, such as that shown in FIG. 8, to offset any drawbacks to a time-varying application of voltage or current, such as increased circuit cost, increase circuit control complexity, increased EMI consideration, or other drawback encountered when implementing a time-varying application of voltage or current, such as provided by the circuit illustrated in FIGS. 10 and 11.

Figure 14:
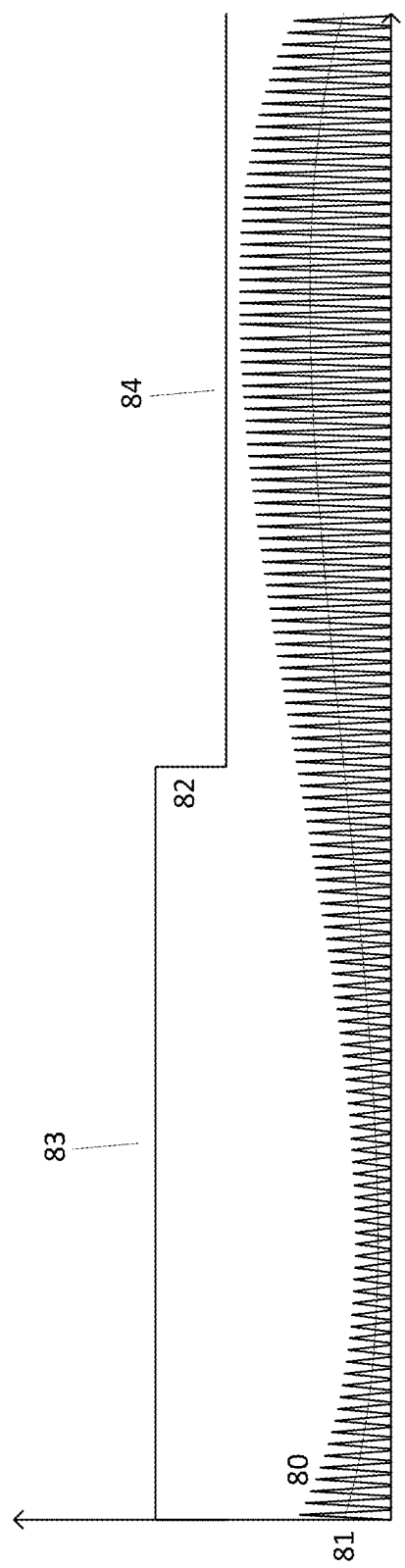
FIG. 14 illustrates example waveforms from a rotor position sensing system associated with the time-varying drive circuit of FIGS. 10 and 11.

FIG. 14 illustrates example waveforms from a rotor position sensing system 20 where the inductive element 60 of the time-varying drive circuit of FIGS. 10 and 11 and represents coil 22 on the printed circuit board 21. Coil Current 80 illustrates the current through inductive element 60, representing the current through coil 22. Position Indication 81 represents the representative position waveform 66 output from the time varying drive circuit. Rotor tooth signal 82 illustrates presence of a tooth aligning with the first permeable element 23 and second permeable element 24. Maximum alignment position 83 corresponds to FIG. 3. Minimum alignment position 84 corresponds to FIG. 4.

FIGS. 15, 16, 17 and 18 illustrate four positions of an example toothed wheel 91 as it moves past an example variable reluctance sensor 92. The variable reluctance sensor 92 contains a coil 93 and is driven by a constant magneto-motive force, produced by a permanent magnet 94.

Figure 15:
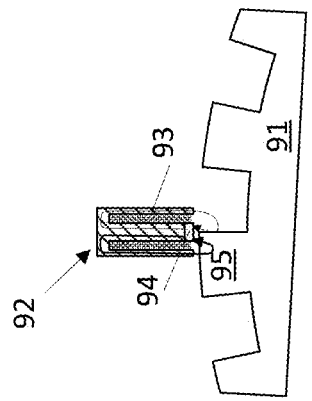
FIGS. 15, 16, 17 and 18 illustrate four positions of an example toothed wheel moving past a reluctance sensor.

For the example illustrated in FIG. 15, the tooth 95 is in maximum alignment with the variable reluctance sensor 92. The magnetic path length for flux through the coil 93 travels through the ferrous material of the tooth 95 and the magnetic flux is at a maximum because the reluctance is at a minimum.

Figure 16:
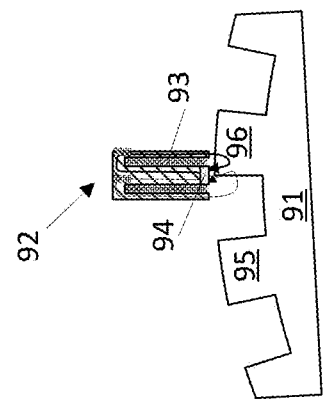

For the example illustrated in FIG. 16, the tooth 95 is traveling out of alignment with the variable reluctance sensor 92. The magnetic path length for flux through the coil 93 travels through the ferrous material of the tooth 95 on one side, but mostly through free air on the other side. The magnetic flux is falling at a maximum rate because the tooth 95 is traveling away from the center of the variable reluctance sensor 92.

Figure 17:
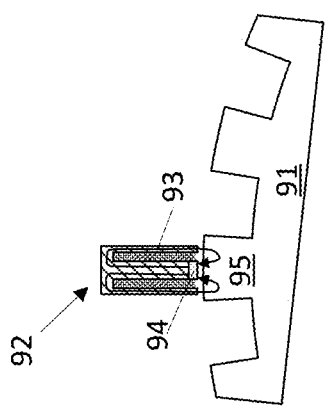

For the example illustrated in FIG. 17, the tooth 95 is at minimum alignment with the variable reluctance sensor 92, while next tooth 96 begins to approach the variable reluctance sensor 92. The magnetic path length for flux through the coil 93 travels through no ferrous material and the magnetic flux is at a minimum because the reluctance is at a maximum.

Figure 18:
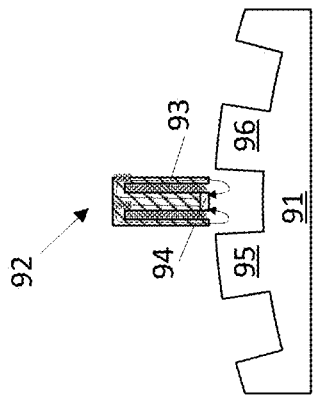

For the example illustrated in FIG. 18, the next tooth 96 is beginning to come into alignment with the variable reluctance sensor 92. The magnetic path length for flux through the coil 93 travels through the ferrous material of the next tooth 96 on one side, most mostly through free air on the other side. The magnetic flux is rising at a maximum rate because the tooth 96 is traveling toward the center of the variable reluctance sensor 92.

FIGS. 19, 20, 21 and 22 illustrate four positions of an example toothed wheel 101 as it moves past an example variable reluctance sensor 102. The variable reluctance sensor 102 is excited by a coil, similar to the coil of the rotor position detection system 20.

Figure 19:
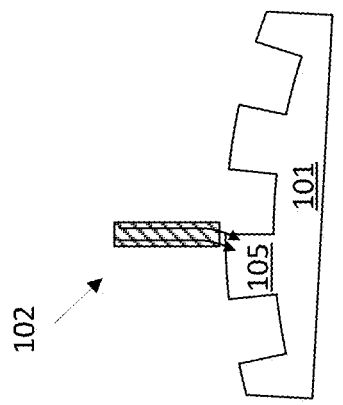
FIGS. 19, 20, 21 and 22 illustrate four positions of an example toothed wheel as it moves past an example variable reluctance sensor.

For the example illustrated in FIG. 19, the tooth 105 is in maximum alignment with the variable reluctance sensor 102. The magnetic path length for flux through the coil travels through the ferrous material of the tooth 105 and the magnetic flux is at a maximum because the reluctance is at a minimum.

Figure 20:
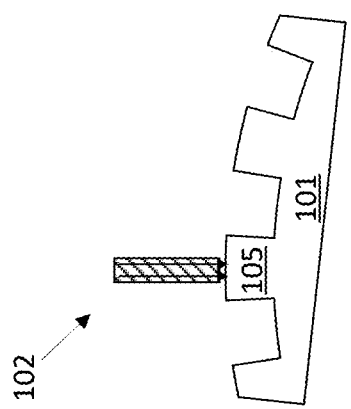

For the example illustrated in FIG. 20, the tooth 105 is traveling out of alignment with the variable reluctance sensor 102. The magnetic path length for flux through the coil travels through the ferrous material of the tooth 105 on one side, but mostly through free air on the other side. The magnetic flux is falling at a maximum rate because the tooth 105 is traveling away from the center of the variable reluctance sensor 102.

Figure 21:
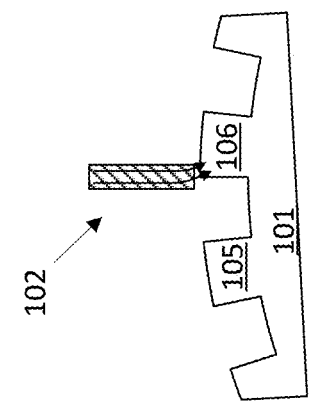

For the example illustrated in FIG. 21, the tooth 105 is at minimum alignment with the variable reluctance sensor 102, while next tooth 106 begins to approach the variable reluctance sensor 102. The magnetic path length for flux through the coil travels through no ferrous material and the magnetic flux is at a minimum because the reluctance is at a maximum.

Figure 22:
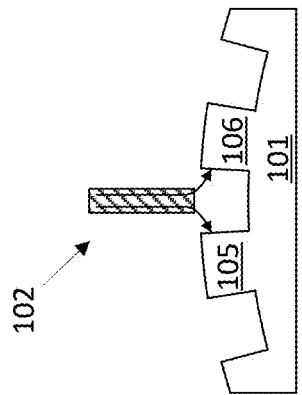

For the example illustrated in FIG. 22, the next tooth 106 is beginning to come into alignment with the variable reluctance sensor 102. The magnetic path length for flux through the coil travels through the ferrous material of the next tooth 106 on one side, most mostly through free air on the other side. The magnetic flux is rising at a maximum rate because the tooth 106 is traveling toward the center of the variable reluctance sensor 102.

FIGS. 23-30 illustrate four positions of an example drilled wheel 111 as it moves past an example variable reluctance sensor 112. One position is illustrated by a front view of FIG. 23 and side view of FIG. 24. One position is illustrated by a front view of FIG. 25 and side view of FIG. 26. One position is illustrated by a front view of FIG. 27 and side view of FIG. 28. One position is illustrated by a front view of FIG. 29 and side view of FIG. 30.

Figure 23:
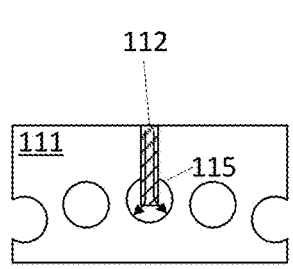
FIGS. 23, 24, 25, 26, 27, 28, 29 and 30 illustrate positions of an example drilled wheel as it moves past an example variable reluctance sensor.
Figure 24:
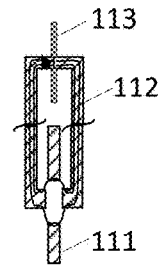

In FIGS. 23/24, 25/26 and 27/28, the variable reluctance sensor 112 is excited by a coil, similar to the coil of the rotor position detection system 20, contained in printed circuit board 113. For FIGS. 29/30, the variable reluctance sensor 112 is excited by a coil 114, wound around the permeable path for the sensor.

For the example illustrated in FIG. 23, the hole 115 is in maximum alignment with the variable reluctance sensor 112. The magnetic path length for flux through the coil travels through the ferrous material of the hole 115 and the magnetic flux is at a minimum because the reluctance is at a maximum.

Figure 25:
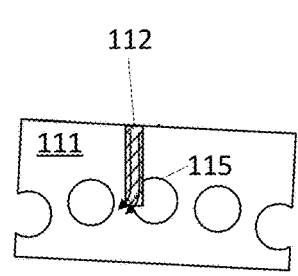
Figure 26:
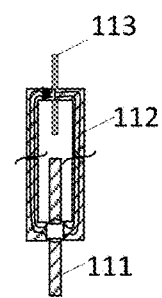

For the example illustrated in FIG. 25, the hole 115 is traveling out of alignment with the variable reluctance sensor 112. The magnetic path length for flux through the coil travels through the ferrous material of the hole 115 on one side, but mostly through free air on the other side. The magnetic flux is rising at a maximum rate because the hole 115 is traveling away from the center of the variable reluctance sensor 112.

Figure 27:
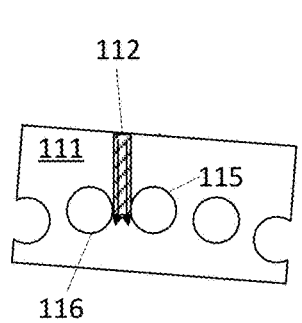
Figure 28:
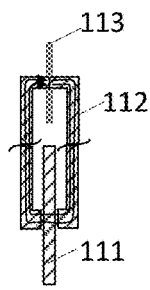

For the example illustrated in FIG. 27, the hole 115 is at minimum alignment with the variable reluctance sensor 112, while next hole 116 begins to approach the variable reluctance sensor 112. The magnetic path length for flux through the coil travels through no ferrous material and the magnetic flux is at a maximum because the reluctance is at a minimum.

Figure 29:
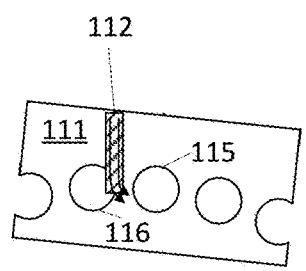
Figure 30:
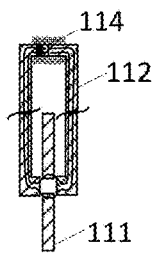

For the example illustrated in FIG. 29, the next hole 116 is beginning to come into alignment with the variable reluctance sensor 112. The magnetic path length for flux through the coil travels through the ferrous material of the next hole 116 on one side, most mostly through free air on the other side. The magnetic flux is falling at a maximum rate because the next hole 116 is traveling toward the center of the variable reluctance sensor 112.

Figure 31:
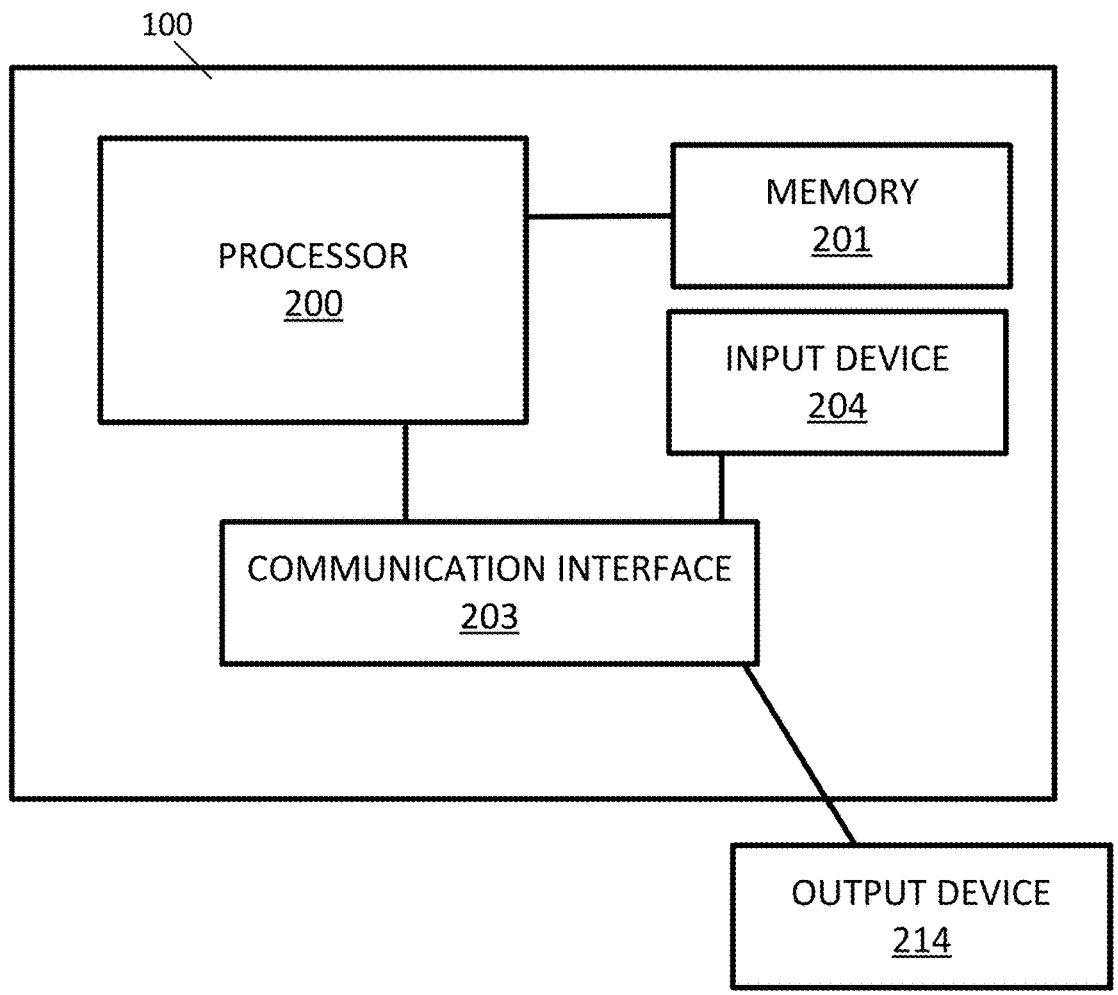
FIG. 31 illustrates an example controller for the rotor position sensing system.

FIG. 31 illustrates an example controller 100, which may be applied as rotor position controller or reluctance sensing circuit. The controller may include a processor 200, a memory 201, and a communication interface 203. The communication interface 203 may communicate with a parallel input signal 210, a sensor input signal 212, a display device 214, and/or an input device 204. Additional, different, or fewer components may be included.

Figure 32:
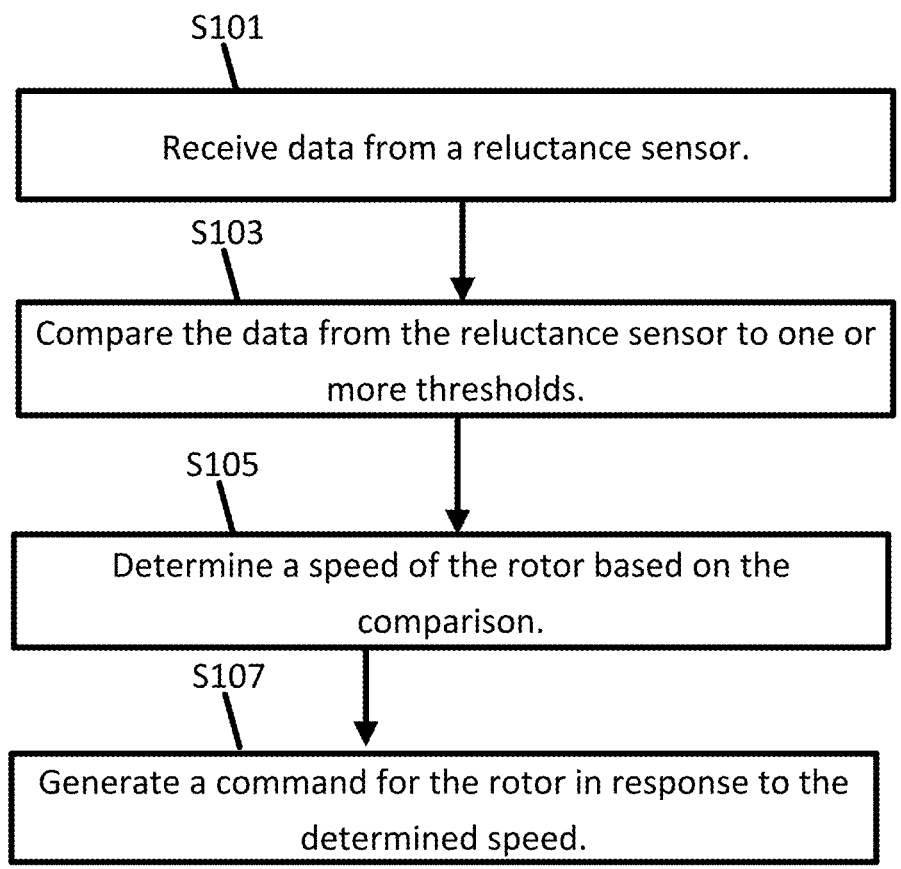
FIG. 32 illustrates an example controller for the rotor position sensing system.

FIG. 32 illustrates an example flow chart for operation of the controller 100. Additional, different, or fewer components may be used.

At act S101, the controller 100 receives data indicative of a current generated by a reluctance sensor of the electric machine. The current may originate with a magnetic flux through a magnetically permeable element positioned in proximity to a rotor of an electric machine. The data may be a voltage value determined by a voltage sensor connected to a reluctance coil configured to receive the magnetic flux.

At act S103, the controller 100 performs a comparison of the data indicative of the current in the reluctance sensor to a threshold. The current generated by the reluctance sensor is proportional to the reluctance of a magnetic circuit including at least one air gap and at least one permeable element. The current generated by the reluctance sensor is proportional to the reluctance of a magnetic circuit including a first permeable element, a second permeable element, and an air gap and between the first permeable element and the second permeable element. The data indicative of the current in the reluctance sensor indicates a presence or absence of rotor teeth spaced apart on the rotor. The data indicative of the current in the reluctance sensor indicates a hole in the rotor and configured to affect magnetic flux to the reluctance.

At act S105, the controller 100 determines a speed of the rotor or a position of the rotor based on the comparison. The controller compares the data indicative of the voltage generated by the reluctance coil in order to estimate a position or speed of the rotor.

At act S107, the controller 100 generates a command for the rotor based on the detected speed of the rotor or position of the rotor. For example, the controller 100 may determine or identify a speed setting (e.g., constant speed) as a target for the speed of the rotor. In another example, the controller 100 may determine or identify a position setting as a target for the position of the rotor (e.g., stepper motor). In another example the controller 100 may determine a speed setting corresponding to a target output (e.g., target output frequency) of a generator. The engine driving the generator may operate at a variable speed with the output voltage controlled by adjusting the engine speed according to the speed setting based on feedback from the reluctance sensor and the controller 100.

The processor 200 may include a general processor, digital signal processor, an application specific integrated circuit (ASIC), field programmable gate array (FPGA), analog circuit, digital circuit, combinations thereof, or other now known or later developed processor. The processor 200 may be a single device or combinations of devices, such as associated with a network, distributed processing, or cloud computing.

The memory 201 may be a volatile memory or a non-volatile memory. The memory 201 may include one or more of a read only memory (ROM), random access memory (RAM), a flash memory, an electronic erasable program read only memory (EEPROM), or other type of memory. The memory 201 may be removable from the network device, such as a secure digital (SD) memory card.

In addition to ingress ports and egress ports, the communication interface 303 may include any operable connection. An operable connection may be one in which signals, physical communications, and/or logical communications may be sent and/or received. An operable connection may include a physical interface, an electrical interface, and/or a data interface.

The communication interface 203 may be connected to a network. The network may include wired networks (e.g., Ethernet), wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory 201) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Processors suitable for the execution of a computer program include, by way of example, both general and special purpose microprocessors, and anyone or more processors of any kind of digital computer. Generally, a processor may receive instructions and data from a read only memory or a random access memory or both. The essential elements of a computer are a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. An electric machine comprising:
   a printed circuit board including traces that form a reluctance coil configured to generate a voltage in presence of a magnetic flux; and a first magnetically permeable element having a first end positioned adjacent to a rotor of the electrical machine and a second end positioned adjacent to the coil of the printed circuit board;

a second magnetically permeable element having a first end positioned adjacent to the rotor of the electrical machine and a second end positioned adjacent to the coil of the printed circuit board;

an air gap between the first magnetically permeable and second magnetically permeable element;

wherein rotation of the rotor causes a change in the magnetic flux through the first magnetically permeable element, second magnetically permeable element, and the air gap, and generation of the voltage across the reluctance coil.

2. The electric machine of claim 1, further comprising:
a plurality of field coils configured to generate a voltage to provide a torque produced by the electrical machine or consumed by the electrical machine.

3. The electric machine of claim 2, wherein the printed circuit board comprises the plurality of field coils.

4. The electric machine of claim 2, wherein the printed circuit board includes a magnetic region including the plurality of field coils and an outer periphery region including the reluctance coil.

5. The electric machine of claim 1, further comprising:
a controller configured to receive data indicative of the voltage generated by the reluctance coil.

6. The electric machine of claim 5, wherein the controller compares the data indicative of the voltage generate by the reluctance coil in order to estimate a position or speed of the rotor.

7. The electric machine of claim 1, wherein the rotor further comprises at least one rotating element and at least one permanent magnet.

8. The electric machine of claim 7, wherein the permanent magnets generate a magnetic flux that flows through the at least one rotating element, the first magnetically permeable element, the second magnetically permeable element and the circuit board including the reluctance coil.

9. The electric machine of claim 1, wherein the electrical machine is an axial air gap electrical machine, a radial air gap electric machine, or a motor.

10. The electric machine of claim 1, wherein the at least one rotating element includes rotor teeth spaced apart, wherein magnetic flux flows through the rotor teeth to the reluctance coil in a pattern that indicates a position or speed of the rotor.

11. The electric machine of claim 1, wherein the at least one rotating element includes a hole configured to affect magnetic flux to the reluctance coil in a pattern that indicates a position or speed of the rotor.

12. The electric machine of claim 1, further comprising:
a driving and filtering circuit to apply a constant direct current to the reluctance coil and to extract a signal indicating a rate of change in the magnetic flux through by the reluctance coil.

13. A method for detection of a rotor of an electric machine, the method comprising:
receiving data indicative of a current generated by a reluctance sensor of the electric machine, wherein the current generated by the reluctance sensor is proportional to the reluctance of a magnetic circuit including a first permeable element, a second permeable element, and an air gap and between the first permeable element and the second permeable element, wherein the first permeable element includes a first end positioned adjacent to a rotor of the electrical machine and a second end positioned adjacent to the reluctance sensor;

performing a comparison of the data indicative of the current in the reluctance sensor to a threshold; and determining a speed of the rotor or a position of the rotor based on the comparison.

14. The method of claim 13, further comprising:
generating a command for the rotor based on the speed of the rotor or position of the rotor.

15. The method of claim 13, wherein the data indicative of the current in the reluctance sensor indicates a presence or absence of rotor teeth spaced apart on the rotor.

16. The method of claim 13, wherein the data indicative of the current in the reluctance sensor indicates a hole in the rotor and configured to affect magnetic flux to the reluctance.

17. A reluctance sensor for an electric machine, the reluctance sensor comprising:
a printed circuit board including a reluctance coil configured to generate a voltage in presence of a magnetic flux;

a first magnetically permeable element having a first end positioned adjacent to a rotor of the electrical machine and a second end positioned adjacent to the coil of the printed circuit board;

a second magnetically permeable element having a first end positioned adjacent to a rotor of the electrical machine and a second end positioned adjacent to the coil of the printed circuit board; and an air gap between the first magnetically permeable and second magnetically permeable element;

wherein rotation of the rotor causes a change in the magnetic flux through the first magnetically permeable element, the second magnetically permeable element and generation of the voltage across the coil.

18. The reluctance sensor of claim 17, further comprising:
a controller configured to receive data indicative of the voltage generated by the reluctance coil.

* * * * *